(12) United States Patent  (10) Patent No.: US 8,844,251 B2
Rumohr et al.  (45) Date of Patent: Sep. 30, 2014

(54) COTTON ACCUMULATOR SYSTEM WITH PADDLES AND UPPER INLET VANE

(71) Applicant: Deere & Company, Moline, IL (US)

(72) Inventors: John O. Rumohr, Pleasant Hill, IA (US); Dan L. Heggen, Slater, IA (US); Donald B. Brooks, Nevada, IA (US); Nile T. Ackerman, Johnston, IA (US); Jeffrey R. Fox, Minburn, IA (US); Scott D. Weber, Bondurant, IA (US); Justin E. Hummel, Des Moines, IA (US); Tom R. Walmsley, Bondurant, IA (US); Mark A. Cracraft, Urbandale, IA (US); Jeffrey S. Wigdahl, Ames, IA (US); Daniel A. Krieg, Pleasant Hill, IA (US)

(73) Assignee: Deere & Company, Moline, IL (US)

(*) Notice: Subject to any disclaimer, the term of this patent is extended or adjusted under 35 U.S.C. 154(b) by 10 days.

(21) Appl. No.: 13/709,645

(22) Filed: Dec. 10, 2012

(65) Prior Publication Data

US 2014/0157745 A1    Jun. 12, 2014

(51) Int. Cl.
*A01D 61/00* (2006.01)
*A01D 46/08* (2006.01)

(52) U.S. Cl.
CPC .................................. *A01D 46/082* (2013.01)
USPC ........................................................ 56/16.6

(58) Field of Classification Search
CPC ... A01D 41/1208; A01D 41/02; A01D 41/12; A01D 43/077; A01D 43/063; B60P 1/40; B60P 1/42; B65G 67/22; B65G 69/0458; B65G 69/0433; B65G 69/04

USPC ................ 56/16.6, 14.6, 475; 460/119, 114; 414/505, 293, 301, 111
See application file for complete search history.

(56) References Cited

U.S. PATENT DOCUMENTS

| | | | | |
|---|---|---|---|---|
| 2,015,954 A | * | 10/1935 | Mitchell | 198/671 |
| 2,410,501 A | * | 11/1946 | Huddle | 406/59 |
| 2,834,175 A | | 5/1958 | Knowles | |
| 2,885,120 A | * | 5/1959 | Kepkay | 222/63 |
| 3,171,241 A | | 3/1965 | Streb | |
| 3,224,560 A | * | 12/1965 | Jarvis | 198/577 |
| 3,327,459 A | | 6/1967 | Logan | |
| 3,372,535 A | | 3/1968 | McCunn et al. | |
| 3,484,802 A | | 12/1969 | Reece et al. | |
| 4,029,228 A | * | 6/1977 | Shaver | 414/505 |
| 4,338,770 A | | 7/1982 | Schlueter | |
| 4,662,160 A | * | 5/1987 | Hubbard et al. | 56/16.6 |
| 4,930,297 A | * | 6/1990 | Schlueter et al. | 56/16.6 |
| 5,406,779 A | * | 4/1995 | Deutsch et al. | 56/32 |
| 5,427,572 A | * | 6/1995 | Deutsch et al. | 460/119 |
| 5,499,491 A | * | 3/1996 | Deutsch et al. | 56/10.2 H |
| 5,509,854 A | * | 4/1996 | Underwood | 460/13 |

(Continued)

FOREIGN PATENT DOCUMENTS

| | | | | |
|---|---|---|---|---|
| CN | 201328252 Y | * | 10/2009 | A01D 43/063 |
| GB | 712576 | | 7/2012 | |
| SU | 1417831 A | * | 8/1988 | A01F 12/60 |

*Primary Examiner* — Árpád Fábián-Kovács

(57) ABSTRACT

A cotton accumulator system for a cotton harvester. The cotton accumulator system includes a cotton storage structure having an upper inlet and a lower outlet. A paddle shaft is coupleable to the cotton storage structure and configured to rotate about an axis. A plurality of paddles is coupleable to the paddle shaft. The plurality of paddles is configured to rotate with the paddle shaft to disperse cotton substantially evenly in the cotton storage structure.

18 Claims, 4 Drawing Sheets

(56) References Cited

U.S. PATENT DOCUMENTS

| | | | |
|---|---|---|---|
| 5,584,762 A * | 12/1996 | Buhler et al. | 460/119 |
| 6,032,446 A | 3/2000 | Gola et al. | |
| 6,159,094 A | 12/2000 | Deutsch | |
| 6,176,779 B1 * | 1/2001 | Riesterer et al. | 460/119 |
| 6,263,650 B1 | 7/2001 | Deutsch et al. | |
| 6,272,821 B1 | 8/2001 | Wigdahl | |
| 6,421,996 B1 | 7/2002 | Deutsch et al. | |
| 6,966,506 B2 * | 11/2005 | McLeod et al. | 241/79.1 |
| 7,018,290 B2 * | 3/2006 | Ramon et al. | 460/119 |
| 7,624,679 B2 * | 12/2009 | Richman et al. | 100/188 R |
| 7,836,673 B2 * | 11/2010 | Digman | 56/475 |
| 2012/0302299 A1 * | 11/2012 | Behnke et al. | 460/6 |

\* cited by examiner

_US 8,844,251 B2_

COTTON ACCUMULATOR SYSTEM WITH PADDLES AND UPPER INLET VANE

FIELD OF THE DISCLOSURE

The present disclosure generally relates to cotton harvesters and more particularly to a cotton accumulator system for a cotton harvester.

BACKGROUND OF THE DISCLOSURE

In order to provide a compact bale or module, cotton harvesters commonly include an on-board module forming structure or other crop processing structure. For example, commonly assigned U.S. Pat. No. 6,263,650, which is hereby incorporated by reference in its entirety, discloses a cotton harvester including a crop processing structure. An accumulation area is disclosed that provides a supply of cotton to the crop processing structure.

SUMMARY OF THE DISCLOSURE

In one embodiment, a cotton accumulator system for a cotton harvester is disclosed. The cotton accumulator system comprises a cotton storage structure comprising an upper inlet and a lower outlet. A paddle shaft is coupleable to the cotton storage structure. The paddle shaft is configured to rotate about an axis. A plurality of paddles is coupleable to the paddle shaft. The plurality of paddles is configured to rotate with the paddle shaft to disperse cotton substantially evenly in the cotton storage structure.

In another embodiment, a cotton harvester for removing cotton from plants is disclosed. The cotton harvester comprises a cotton accumulator system comprising a cotton storage structure. The cotton storage structure comprises an upper inlet and a lower outlet. A paddle shaft is coupleable to the cotton storage structure. The paddle shaft is configured to rotate about an axis. A plurality of paddles is coupleable to the paddle shaft. The plurality of paddles is configured to rotate with the paddle shaft to disperse cotton substantially evenly in the cotton storage structure. The cotton harvester comprises a selectively operable processing structure configured for receiving cotton from the cotton accumulator system.

In yet another embodiment, a cotton harvester for removing cotton from plants is disclosed. The cotton harvester comprises a harvesting structure configured for harvesting cotton. A first duct structure is in communication with the harvesting structure and configured for receiving cotton from the harvesting structure. A cleaner is in communication with the first duct structure and configured for receiving cotton from the first duct structure and removing trash from the cotton. A second duct structure is in communication with the cleaner and configured for receiving cotton from the cleaner. A cotton accumulator system comprises a cotton storage structure comprising a lower outlet and an upper inlet in communication with the second duct structure and configured for receiving cotton from the second duct structure. The cotton accumulator system comprises a paddle shaft comprising a length. The paddle shaft is configured for rotating about an axis. A plurality of paddles is coupleable to the paddle shaft. The plurality of paddles is configured for rotating with the paddle shaft to disperse cotton substantially evenly in the cotton storage structure. The cotton harvester comprises a vane positioned adjacent the upper inlet. The vane is configured for directing the cotton along the length of the paddle shaft. A feeder is in communication with the lower outlet. The feeder is configured for conveying cotton through the lower outlet. A selectively operable processing structure is configured for receiving cotton from the feeder.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Further embodiments of the invention may include any combination of features from one or more dependent claims, and such features may be incorporated, collectively or separately, into any independent claim.

DETAILED DESCRIPTION

Figure 1:
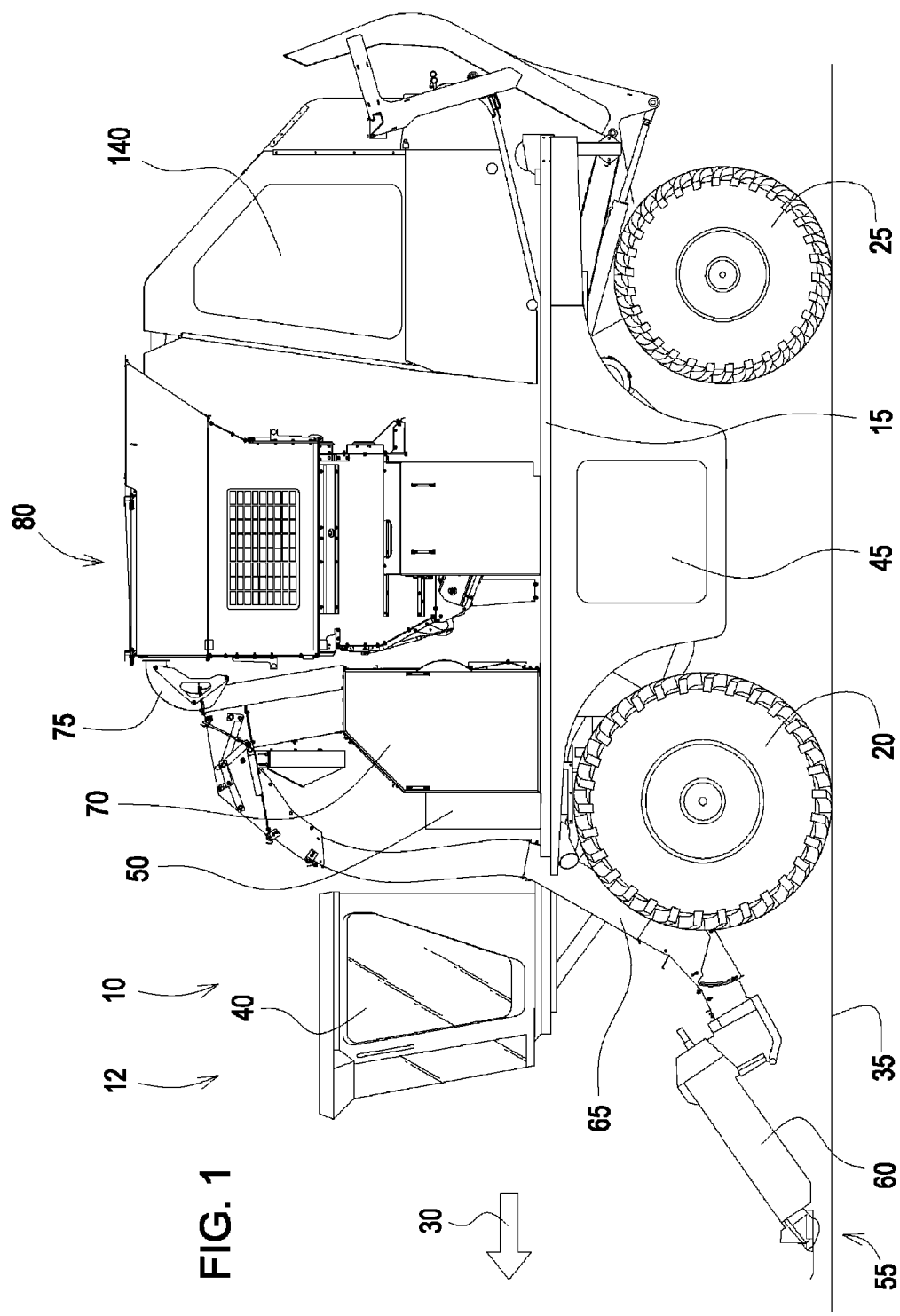
FIG. 1 is a side view of a cotton harvester according to one embodiment.

FIG. 1 illustrates a cotton harvester 10 according to one embodiment. The illustrated cotton harvester 10 is a cotton stripper 12. Alternatively, the cotton harvester 10 may be a cotton picker. The cotton harvester 10 includes a chassis 15. The chassis 15 is supported by front wheels 20 and rear wheels 25. The cotton harvester 10 is adapted for movement in a forward direction 30 through a field 35 to harvest cotton. An operator station 40 is supported by the chassis 15. A power module 45 may be supported below the chassis 15. A fuel tank 50 may be supported on the chassis 15.

A harvesting structure 55 is coupleable to the chassis 15. The harvesting structure 55 is configured to remove cotton from the field 35. The illustrated harvesting structure 55 is a stripper row unit 60 as described in commonly assigned U.S. Pat. No. 4,338,770, which is hereby incorporated by reference in its entirety. Alternatively, a picker row unit may be used.

A first duct structure 65 may be in communication with the harvesting structure 55. The first duct structure 65 is configured for receiving cotton from the harvesting structure 55.

A cleaner 70 may be in communication with the first duct structure 65. The cleaner 70 is configured for receiving cotton from the first duct structure 65 and removing trash from the cotton. The cleaner 70 is of the type described in commonly assigned U.S. Pat. Nos. 4,606,177 and 6,159,094, which are hereby incorporated by reference in their entirety.

Figure 2:
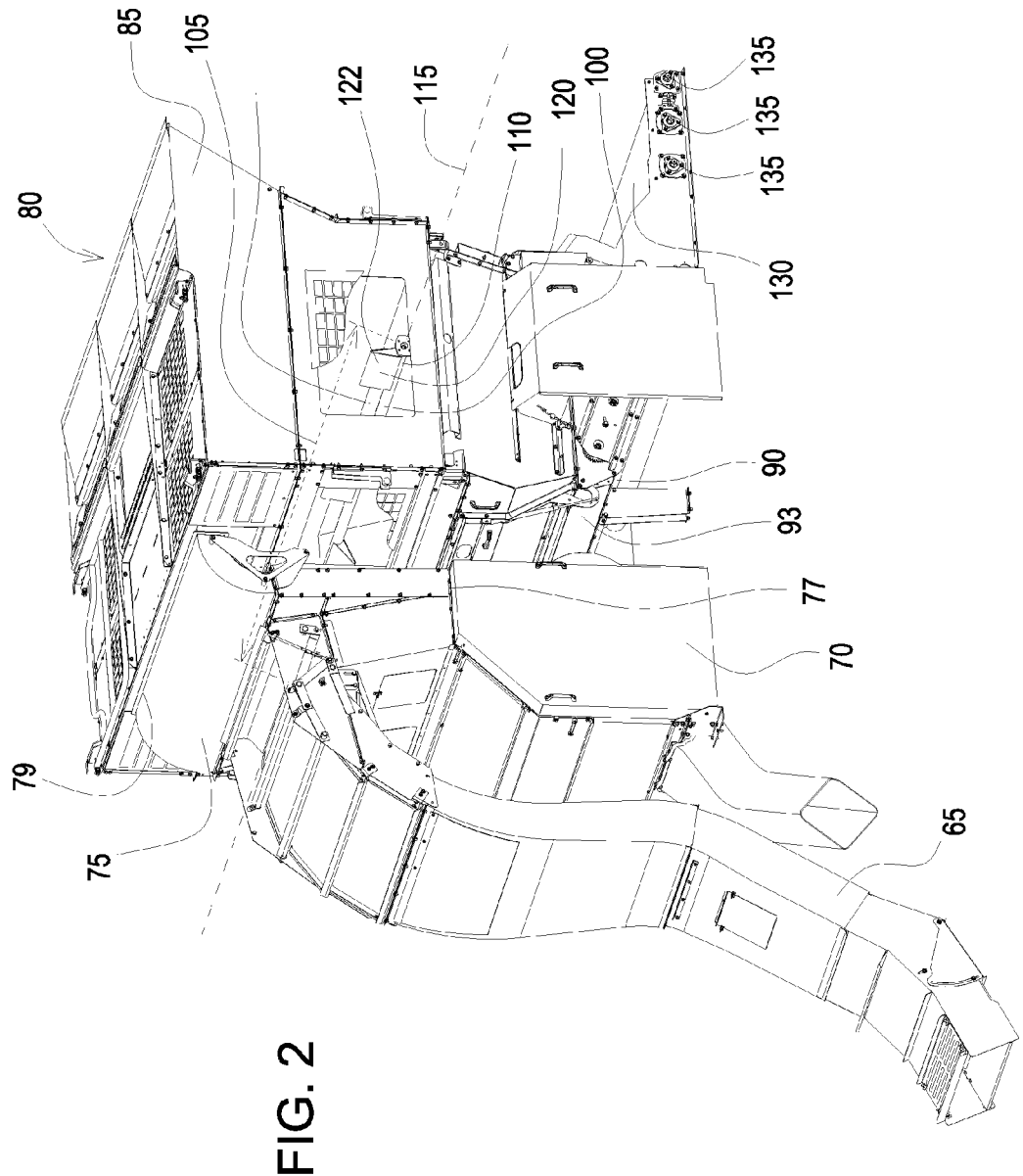
FIG. 2 is a perspective view of a cotton accumulator system of the cotton harvester of FIG. 1.
Figure 3:
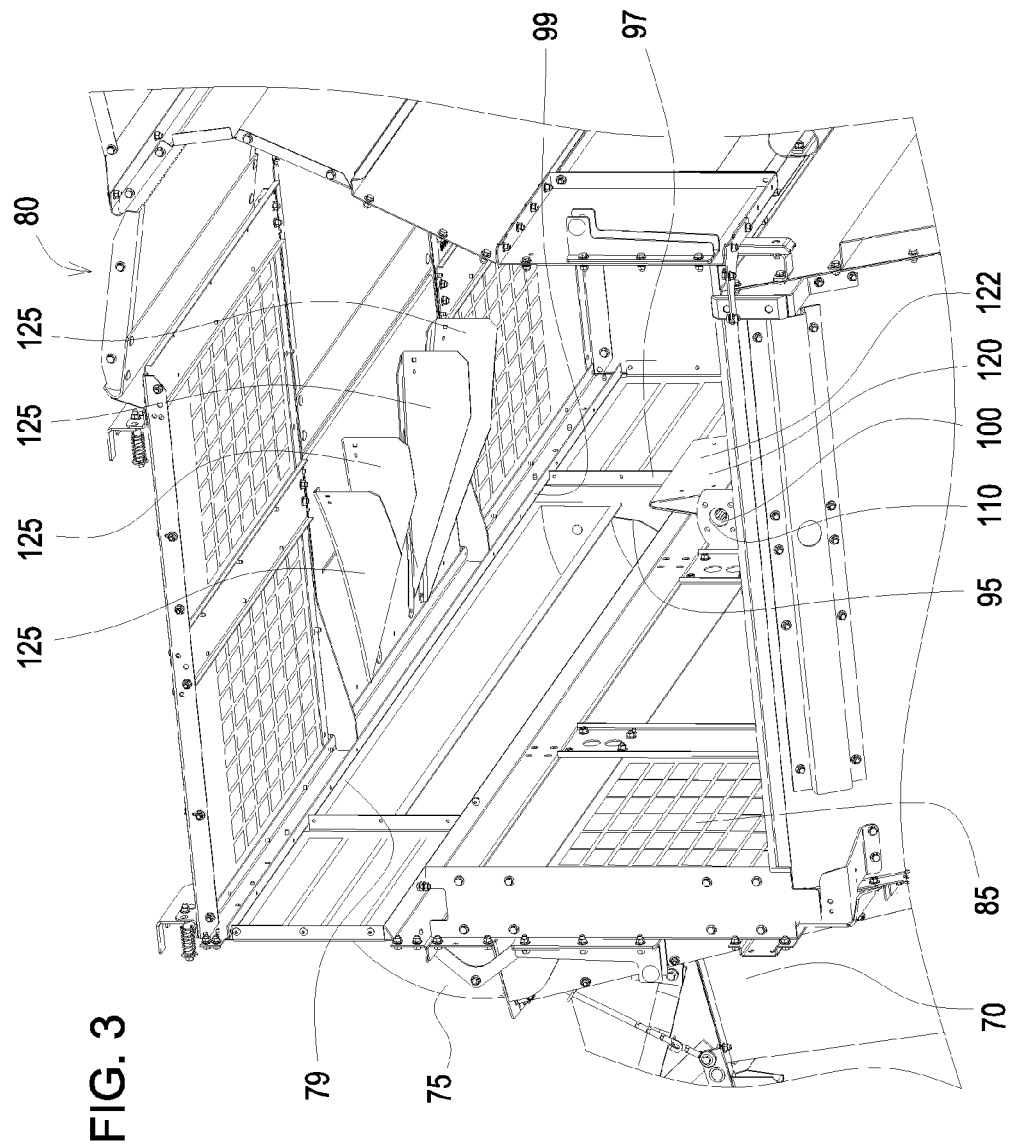
FIG. 3 is a perspective view of a portion of the cotton accumulator system of the cotton harvester of FIG. 1.

With reference to FIGS. 1-3, a second duct structure 75 may be in communication with the cleaner 70 for receiving cotton therefrom. The second duct structure 75 may be configured to widen out the flow of cotton from the cleaner 70. Referring to FIG. 2, exemplarily, cotton may enter the second duct structure 75 through a rectangular second duct structure inlet 77 including a 1524 mm by 127 mm dimension. Cotton may exit the second duct structure 75 through a rectangular second duct structure outlet 79 including a 2134 mm by 127 mm dimension. Other shapes and dimensions of the second duct structure inlet and outlet 77, 79 are contemplated by this disclosure.

Referring to FIGS. 1 and 2, a cotton accumulator system 80 may be in communication with the second duct structure 75. The cotton accumulator system 80 may be configured to receive cotton from the harvesting structure 55 via the first duct structure 65, the cleaner 70, and the second duct structure 75. The second duct structure 75 may widen out the flow of cotton to the cotton accumulator system 80 enabling the cotton accumulator system 80 to fill substantially evenly (difference in height of cotton of about 3 feet) and to full capacity. Alternatively, the cleaner 70 may be as wide as the cotton accumulator system 80 so that there is no need for the second duct structure 75 to widen out the flow of cotton.

With reference to FIG. 2, the cotton accumulator system 80 includes a cotton storage structure 85. The cotton storage structure 85 includes a lower outlet 90 on a lower portion 93. Referring to FIG. 3, the cotton storage structure 85 includes an upper inlet 95 on a forward portion 97. The upper inlet 95 is configured for receiving cotton from the cleaner 70 via the second duct structure 75.

With continued reference to FIG. 3, exemplarily, cotton exiting the second duct structure outlet 79 enters the upper inlet 95 from about 0 mm to about 127 mm below a top 99 of the cotton storage structure 85. This enables cotton to be constantly entering the cotton storage structure 85 at a height that allows the cotton in the storage structure 85 to roll underneath the incoming flow of cotton.

Referring to FIG. 2, the cotton accumulator system 80 includes a paddle shaft 100. The paddle shaft 100 includes a length 105 and a periphery 110. The paddle shaft 100 is configured to rotate about an axis 115 substantially parallel (from about plus thirty degrees to about minus thirty degrees from parallel) to the forward portion 97 (FIG. 3).

A plurality of paddles 120 is coupleable to the paddle shaft 100. Exemplarily, the plurality of paddles 120 is coupleable to the periphery 110 of the paddle shaft 100 and spaced along the length 105. It is contemplated by this disclosure that the plurality of paddles 120 may be equally spaced or spaced in other configurations. Exemplarily, the plurality of paddles 120 may be staggered at substantially one-hundred and twenty degrees (from about plus five degrees to about minus five degrees) around the paddle shaft 100. The plurality of paddles 120 may comprise metal or other materials for moving cotton. The plurality of paddles 120 may comprise a triangular portion 122 or other configurations.

With reference to FIG. 3, the cotton accumulator system 80 includes a vane 125 that is positioned adjacent the upper inlet 95. The vane 125 may direct cotton along the length 105 of the paddle shaft 100 enabling the cotton accumulator system 80 to fill substantially evenly (difference in height of cotton of about 3 feet) and to full capacity.

Referring to FIG. 2, a feeder 130 is in communication with the cotton accumulator system 80. The feeder 130 is configured to receive cotton from the cotton accumulator system 80 and convey cotton through the lower outlet 90. The feeder 130 includes a metering roll 135 configured to compress the cotton and transfer the cotton to a selectively operable processing structure 140 (FIG. 1).

With reference to FIG. 1, the selectively operable processing structure 140 is configured for receiving cotton from the feeder 130 (FIG. 2). The selectively operable processing structure 140 may form the cotton into a module and eject the module.

In operation, the vane 125 is configured to direct the cotton along the length 105 of the paddle shaft 100. The plurality of paddles 120 is configured for rotating with the paddle shaft 100 to disperse cotton substantially along the length 105 of the paddle shaft 100 (within about a few feet of the length 105). The plurality of paddles 120 moves cotton toward the forward portion 97 of the cotton storage structure 85 to enable the cotton storage structure 85 to be substantially evenly filled (difference in height of cotton of about 3 feet) and packed down. This helps to prevent the cotton from forming a hump in the middle of the cotton storage structure 85. If the cotton harvester 10 is operated too fast in higher yielding cotton and during module ejection the cotton hump could clog the second duct structure 75 and the cleaner 70 and reduce the performance of the cotton harvester 10.

Figure 4:
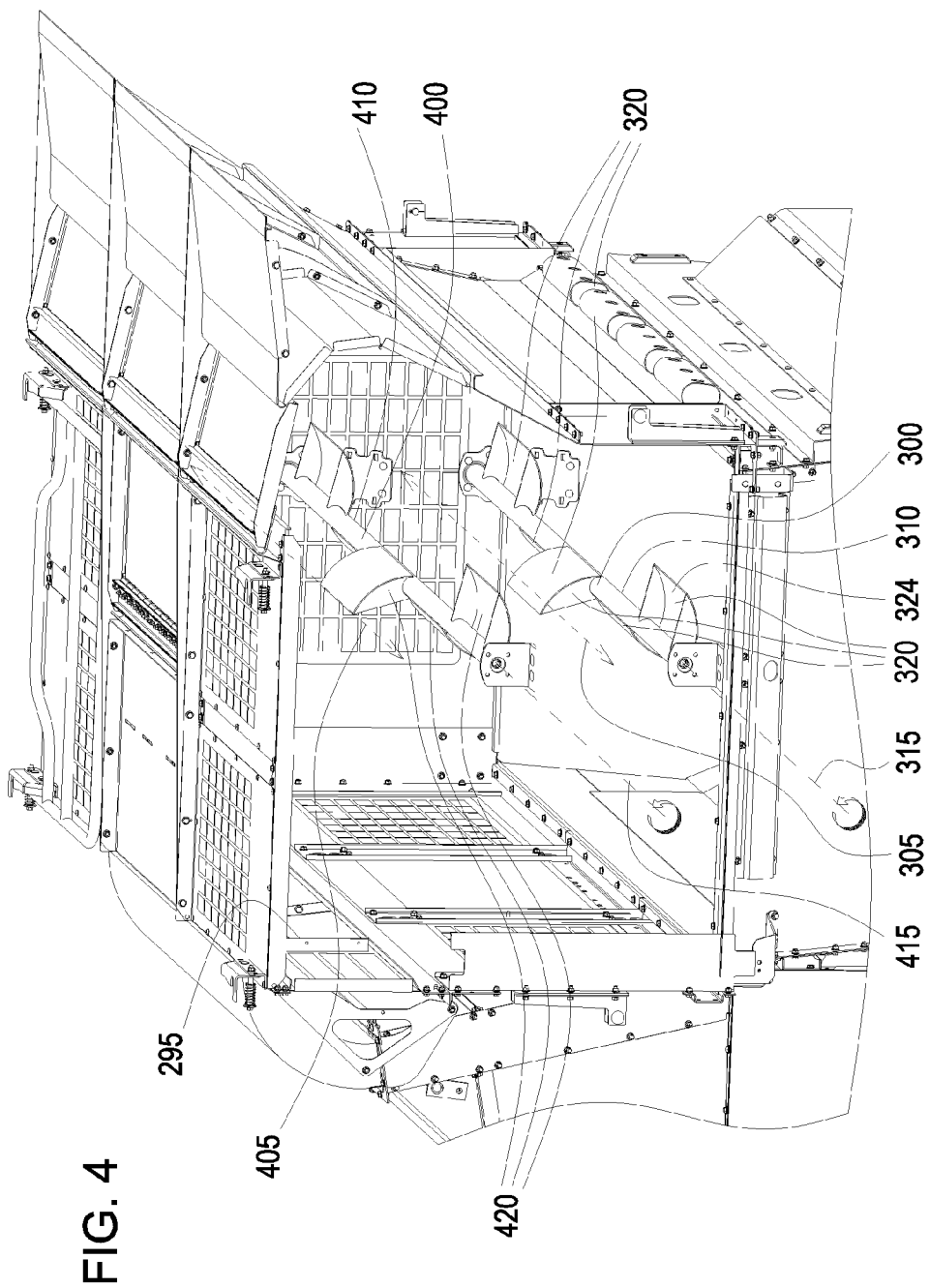
FIG. 4 is a perspective view of a portion of a cotton accumulator system of a cotton harvester according to another embodiment.

FIG. 4 illustrates a cotton accumulator system 280 according to another embodiment. The cotton accumulator system 280 includes features similar to the cotton accumulator system 80 of FIGS. 1-3, and therefore, like components have been given like reference numbers plus 200 and only differences between the cotton accumulator systems 80 and 280 will be discussed in detail below.

Referring to FIG. 4, illustratively, a first paddle shaft 300 includes a first length 305 and a first periphery 310. The first paddle shaft 300 is configured to rotate about a first axis 315 substantially parallel (plus or minus thirty degrees) to an upper inlet 295. A first plurality of paddles 320 is coupleable to the first paddle shaft 300. Exemplarily, the first plurality of paddles 320 is coupleable to the first periphery 310 of the first paddle shaft 300 and spaced along the first length 305. The first plurality of paddles 320 may comprise a concave portion 324 or other configurations.

A second paddle shaft 400 includes a second length 405 and a second periphery 410. The second paddle shaft 400 is positioned adjacent the first paddle shaft 300. Exemplarily, the second paddle shaft 400 is positioned above the first paddle shaft 300. The second paddle shaft 400 is configured to rotate about a second axis 415 substantially parallel (plus or minus thirty degrees) to the upper inlet 295. A second plurality of paddles 420 is coupleable to the second paddle shaft 400. Exemplarily, the second plurality of paddles 420 is coupleable to the second periphery 410 of the second paddle shaft 400 and spaced along the second length 405. The second plurality of paddles 420 may comprise a concave portion 324 or other configurations.

It is contemplated by this disclosure that the first and second plurality of paddles 320, 420 may be equally spaced or spaced in other configurations. The first and second plurality of paddles 320, 420 may comprise metal or other materials for moving cotton.

Various features are set forth in the following claims.

What is claimed is:

1. A cotton accumulator system for a cotton harvester comprising:
    a cotton storage structure comprising a forward portion, an upper inlet and a lower outlet;
    a paddle shaft coupleable to the cotton storage structure and configured to rotate about an axis substantially parallel to the forward portion;
    a plurality of paddles coupleable to the paddle shaft and configured for rotating with the paddle shaft to disperse cotton substantially evenly in the cotton storage structure; and
    a vane positioned adjacent the upper inlet, the vane configured to direct the cotton along the length of the paddle shaft.

2. The cotton accumulator system of claim 1, further comprising a cleaner configured for removing trash from cotton.

3. The cotton accumulator system of claim 2, further comprising a first duct structure configured for conveying cotton to the cleaner and a second duct structure configured for conveying cotton from the cleaner to the upper inlet.

4. The cotton accumulator system of claim 3, further comprising a harvesting structure configured for harvesting cotton and conveying cotton to the first duct structure.

5. The cotton accumulator system of claim 1, further comprising a feeder configured for conveying cotton through the lower outlet to a selectively operable processing structure.

6. The cotton accumulator system of claim 1, wherein the paddle comprises a concave portion.

7. The cotton accumulator system of claim 1, wherein the paddle comprises a triangular portion.

8. The cotton accumulator system of claim 1, wherein the plurality of paddles are staggered at substantially one-hundred and twenty degrees around the paddle shaft.

9. A cotton harvester for removing cotton from plants, the cotton harvester comprising:
   a cotton accumulator system comprising a cotton storage structure comprising a forward portion, an upper inlet and a lower outlet; a paddle shaft coupleable to the cotton storage structure and configured to rotate about an axis substantially parallel to the forward portion; and a plurality of paddles coupleable to the paddle shaft and configured for rotating with the paddle shaft to disperse cotton substantially evenly in the cotton storage structure;
   a selectively operable processing structure configured for receiving cotton from the cotton accumulator system; and
   a vane positioned adjacent the upper inlet, the vane configured to direct the cotton along the length of the paddle shaft.

10. The cotton harvester of claim 9, further comprising a cleaner configured for removing trash from cotton.

11. The cotton harvester of claim 10, further comprising a first duct structure configured for conveying cotton to the cleaner and a second duct structure configured for conveying cotton from the cleaner to the upper inlet.

12. The cotton harvester of claim 11, further comprising a harvesting structure configured for harvesting cotton and conveying cotton to the first duct structure.

13. The cotton harvester of claim 9, further comprising a feeder configured for conveying cotton through the lower outlet to the selectively operable processing structure.

14. The cotton harvester of claim 9, wherein the paddle comprises a concave portion.

15. The cotton harvester of claim 9, wherein the plurality of paddles are staggered at substantially one-hundred and twenty degrees around the periphery of the paddle shaft.

16. The cotton harvester of claim 9, wherein the paddle shaft is a first paddle shaft and the plurality of paddles is a first plurality of paddles, the cotton harvester further comprising a second paddle shaft positioned adjacent the first paddle shaft and a second plurality of paddles coupleable to the second paddle shaft and configured to rotate with the second paddle shaft.

17. The cotton harvester of claim 16, wherein the second paddle shaft is positioned above the first paddle shaft.

18. A cotton harvester for removing cotton from plants, the cotton harvester comprising:
   a harvesting structure configured for harvesting cotton;
   a first duct structure in communication with the harvesting structure and configured for receiving cotton from the harvesting structure;
   a cleaner in communication with the first duct structure and configured for receiving cotton from the first duct structure and removing trash from the cotton;
   a second duct structure in communication with the cleaner and configured for receiving cotton from the cleaner;
   a cotton accumulator system comprising a cotton storage structure comprising a lower outlet and an upper inlet in communication with the second duct structure and configured for receiving cotton from the second duct structure; a paddle shaft comprising a length and configured to rotate about an axis; a plurality of paddles coupleable to the paddle shaft, the plurality of paddles configured for rotating with the paddle shaft to disperse cotton substantially evenly in the cotton storage structure;
   a vane positioned adjacent the upper inlet, the vane configured to direct the cotton along the length of the paddle shaft;
   a feeder in communication with the lower outlet and configured for conveying cotton through the lower outlet; and
   a selectively operable processing structure in communication with the feeder and configured for receiving cotton from the feeder.

* * * * *